US008862861B2

(12) United States Patent
Olson et al.

(10) Patent No.: US 8,862,861 B2
(45) Date of Patent: Oct. 14, 2014

(54) SUPPRESSING BRANCH PREDICTION INFORMATION UPDATE BY BRANCH INSTRUCTIONS IN INCORRECT SPECULATIVE EXECUTION PATH

(75) Inventors: Christopher H. Olson, Austin, TX (US); Manish K. Shah, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 440 days.

(21) Appl. No.: 13/228,329

(22) Filed: Sep. 8, 2011

(65) Prior Publication Data

US 2012/0290820 A1 Nov. 15, 2012

Related U.S. Application Data

(60) Provisional application No. 61/485,891, filed on May 13, 2011.

(51) Int. Cl.
*G06F 9/38* (2006.01)

(52) U.S. Cl.
CPC ............ *G06F 9/3851* (2013.01); *G06F 9/3844* (2013.01); *G06F 9/3861* (2013.01); *G06F 9/3842* (2013.01); *G06F 9/3806* (2013.01)
USPC ........ 712/233; 712/239; 712/240; 712/E9.05; 712/E9.06

(58) Field of Classification Search
None
See application file for complete search history.

(56) References Cited

U.S. PATENT DOCUMENTS

| | | | |
|---|---|---|---|
| 5,586,278 A | 12/1996 | Papworth et al. | |
| 5,687,338 A * | 11/1997 | Boggs et al. | 712/205 |
| 5,870,579 A * | 2/1999 | Tan | 712/217 |
| 7,152,155 B2 | 12/2006 | McIlvaine et al. | |
| 7,363,477 B2 | 4/2008 | Srinivasan et al. | |
| 7,523,296 B2 | 4/2009 | Wang et al. | |
| 7,624,254 B2 | 11/2009 | Smith et al. | |
| 7,711,934 B2 | 5/2010 | Kishore et al. | |
| 2002/0087844 A1 * | 7/2002 | Walterscheidt et al. | 712/228 |
| 2005/0015577 A1 | 1/2005 | Kruckemyer | |
| 2006/0282829 A1 | 12/2006 | McIlvaine et al. | |
| 2007/0101110 A1 | 5/2007 | Kishore et al. | |

OTHER PUBLICATIONS

Guan-Ying Chiu, Hui-Chin Yang, Li, W.Y.-H., Chung-Ping Chung, "Mechanism for return stack and branch history corrections under misprediction in deep pipeline design," 13th Asia-Pacific Computer Systems Architecture Conference, 2008, 8 pages.

(Continued)

*Primary Examiner* — Kenneth Kim
(74) *Attorney, Agent, or Firm* — Meyertons, Hood, Kivlin, Kowert & Goetzel, P.C.

(57) ABSTRACT

Techniques are disclosed relating to a processor that is configured to execute control transfer instructions (CTIs). In some embodiments, the processor includes a mechanism that suppresses results of mispredicted younger CTIs on a speculative execution path. This mechanism permits the branch predictor to maintain its fidelity, and eliminates spurious flushes of the pipeline. In one embodiment, a misprediction bit is be used to indicate that a misprediction has occurred, and younger CTIs than the CTI that was mispredicted are suppressed. In some embodiments, the processor may be configured to execute instruction streams from multiple threads. Each thread may include a misprediction indication. CTIs in each thread may execute in program order with respect to other CTIs of the thread, while instructions other than CTIs may execute out of program order.

16 Claims, 7 Drawing Sheets

(56) References Cited

OTHER PUBLICATIONS

Ching-Long Su, Despain, A.M., "Branch with masked squashing in superpipelined processors," Proceedings the 21st Annual International Symposium on Computer Architecture, 1994, pp. 130-140.

Ching-Long Su, Despain, A.M., "Minimizing branch misprediction penalties for superpipelined processors," Proceedings of the 27th Annual International Symposium on Microarchitecture, 1994, pp. 138-142.

Gummaraju, J., Franklin, M., "Branch prediction in multi-threaded processors," Proceedings at the International Conference on Parallel Architectures and Compilation Techniques, 2000, pp. 179-188.

Sendag, R., Yi, J.J., Peng-fei Chuang, "Branch Misprediction Prediction: Complementary Branch Predictors," IEEE Computer Architecture Letters, vol. 6, No. 2, Jul.-Dec. 2007, pp. 49-52.

International Search Report and Written Opinion in Application No. PCT/US2012/037813, mailed Sep. 14, 2012, pp. 1-11.

* cited by examiner

SUPPRESSING BRANCH PREDICTION INFORMATION UPDATE BY BRANCH INSTRUCTIONS IN INCORRECT SPECULATIVE EXECUTION PATH

RELATED APPLICATION

The present application claims the benefit of priority to U.S. Provisional Application No. 61/485,891, filed May 13, 2011, the disclosure of which is incorporated by reference herein in its entirety

BACKGROUND

1. Technical Field

This disclosure relates to processors, and more specifically to preventing branch predictor corruption in out-of-order processors.

2. Description of the Related Art

Modern superscalar microprocessors achieve high performance by executing multiple instructions in parallel and out-of-program-order. Control transfer instructions (CTIs) such as branches, calls, and returns, which are highly prevalent in programs, can cause pipelined microprocessors to stall because the instructions to be executed after the control transfer instructions are not known until the control transfer instruction is executed. These stalls can result in significant loss of performance.

Modern microprocessors employ branch prediction techniques to speculatively fetch and execute instructions beyond CTIs. Branch prediction involves predicting the direction and the target of the CTI. If the CTI is mispredicted either due to the direction prediction or the target prediction being incorrect, then all instructions speculatively fetched beyond the CTI are thrown away (flushed), and new instructions are fetched by the Instruction Fetch Unit (IFU) from the correct path. Also, upon detection of a mispredicted CTI, a branch predictor is typically updated using the actual results of the CTI to enhance its future prediction accuracy. In some microprocessors, the branch predictor is updated with the results of every CTI.

If a CTI is mispredicted, instructions speculatively fetched beyond the CTI may be further CTI instructions that are younger than the mispredicted CTI. Before flushing speculative instructions beyond the CTI, processors must execute instructions older than the CTI. While waiting for such older instructions to execute, younger CTIs from a mispredicted speculative execution path may degrade branch predictor accuracy if allowed to update the branch predictor. Such younger CTIs may also cause spurious instruction flushes and/or incorrect updates to the IFU.

Modern microprocessors commonly implement chip level multi-threading (CMT) to improve performance. In CMT processors, multiple software threads are concurrently active in the processor, and each active thread has dedicated hardware resources to store its state. Efficient execution of instructions from multiple software threads requires ability to predict CTIs from different threads. Execution of multiple threads on CMT processors may cause execution of CTIs from different threads to be interleaved.

SUMMARY

This disclosure relates to a processor configured to execute control transfer instructions (CTIs). In some embodiments, a mechanism is disclosed that suppresses results of younger CTIs on mispredicted speculative execution paths. This mechanism permits the branch predictor to maintain its fidelity, eliminates spurious flushes of the pipeline, and prevents incorrect instruction fetch unit (IFU) updates.

In some embodiments, the mechanism works in the presence of multiple processor threads and ensures that while results from speculative CTIs on a given thread are suppressed, non-speculative CTIs on other threads continue normal execution and are able to update the branch predictor. Also, mispredicted non-speculative CTIs on other threads may continue to flush the pipeline stages, which correspond to that thread, and redirect the IFU to fetch instructions on corrected paths for those threads.

In one exemplary embodiment, a bit indicating a misprediction is set when a CTI misprediction occurs. CTIs are executed in-order with respect to other CTIs in an execution thread. CTIs that occur when the misprediction bit is set are known to be on an incorrect execution path, because they are younger than the CTI that caused the misprediction bit to be set. Such younger CTIs are not allowed to cause pipeline flushes, updates to IFU, or updates to the branch predictor. The misprediction bit is cleared when all older instructions in the execution thread (relative to the CTI that caused the misprediction bit to be set) finish executing or a trap or exception occurs, and all younger instructions are flushed from the pipeline. In some embodiments, the misprediction bit may suppress results (e.g., branch predictor updates, pipeline flushes, and IFU updates) of CTIs on mispredicted execution paths.

DETAILED DESCRIPTION

Figure 1:
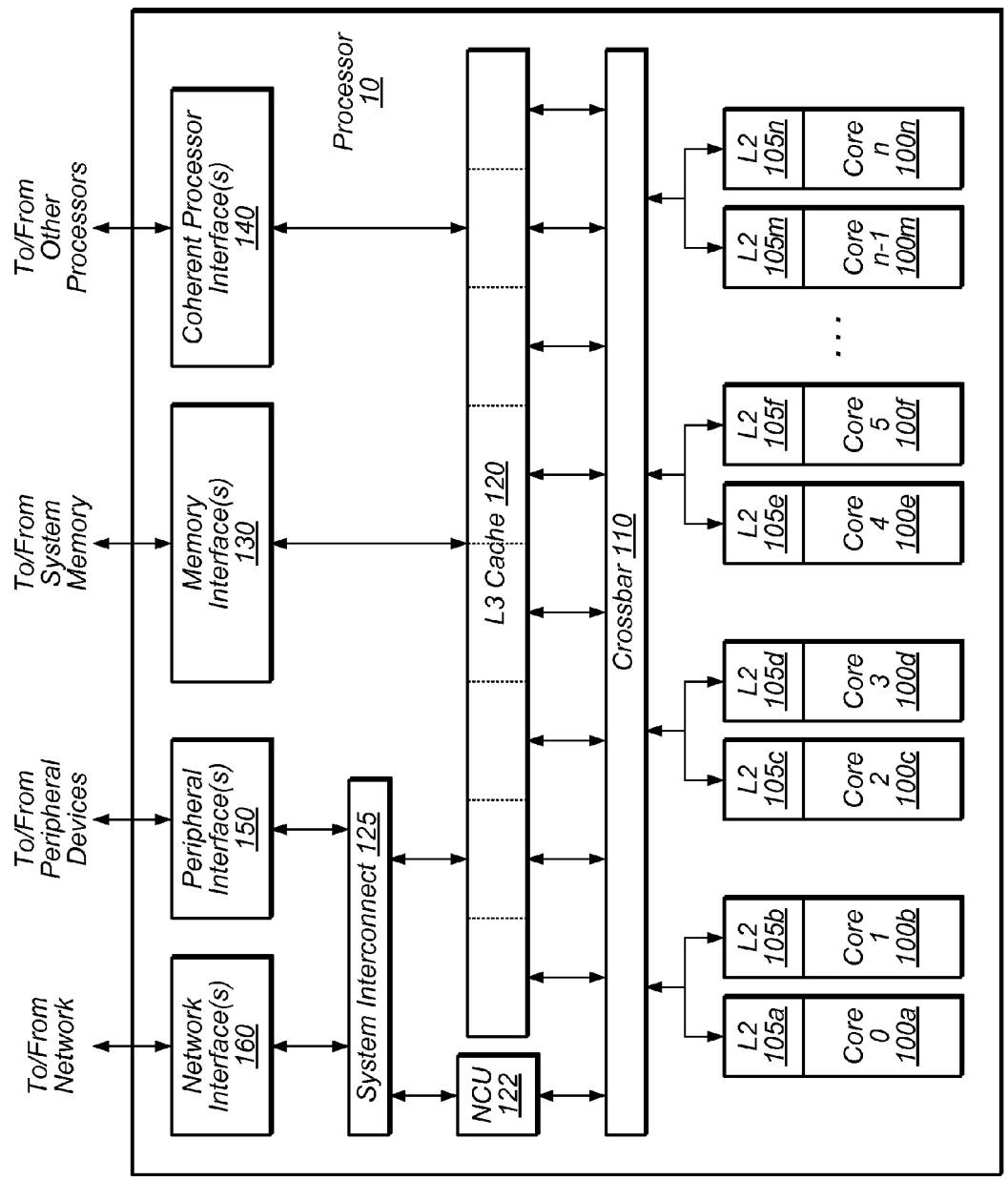
FIG. 1 is a block diagram of one embodiment of a multi-core processor.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

"First," "Second," etc. As used herein, these terms are used as labels for nouns that they precede, and do not imply any type of ordering (e.g., spatial, temporal, logical, etc.). For example, in a processor having two branch prediction units, the terms "first" and "second" are merely labels used to refer to either of these units.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Execute." This term has its ordinary and accepted meaning in the art, and includes all actions that may be performed by a processor to effectuate the completion of the instruction, including fetch, decode, issue, as well as actually computing the result of the instruction. When a functional unit is described herein as "executing" a particular instruction, this term refers to computing a result of the particular instruction (e.g., computing the sum of the contents of two registers).

"Thread." This term has its ordinary and accepted meaning in the art, and includes a set of instructions within a program that is executable by a processor. The term "thread" may, for example, refer to a group of instructions executing on a processor as a result of a "fork" or other similar operation. Instructions described herein as being "in" a thread are a part of the set of instructions for a thread.

"Concurrently Storing/Simultaneously Storing." As used herein, these phrases refer to storing items (e.g., misprediction information for different threads) for some overlapping period. Note that these phrases do not necessary imply that the storage of two concurrently stored items begins at the same time or that the two items are stored for the same length of time.

Introduction

Figure 2:
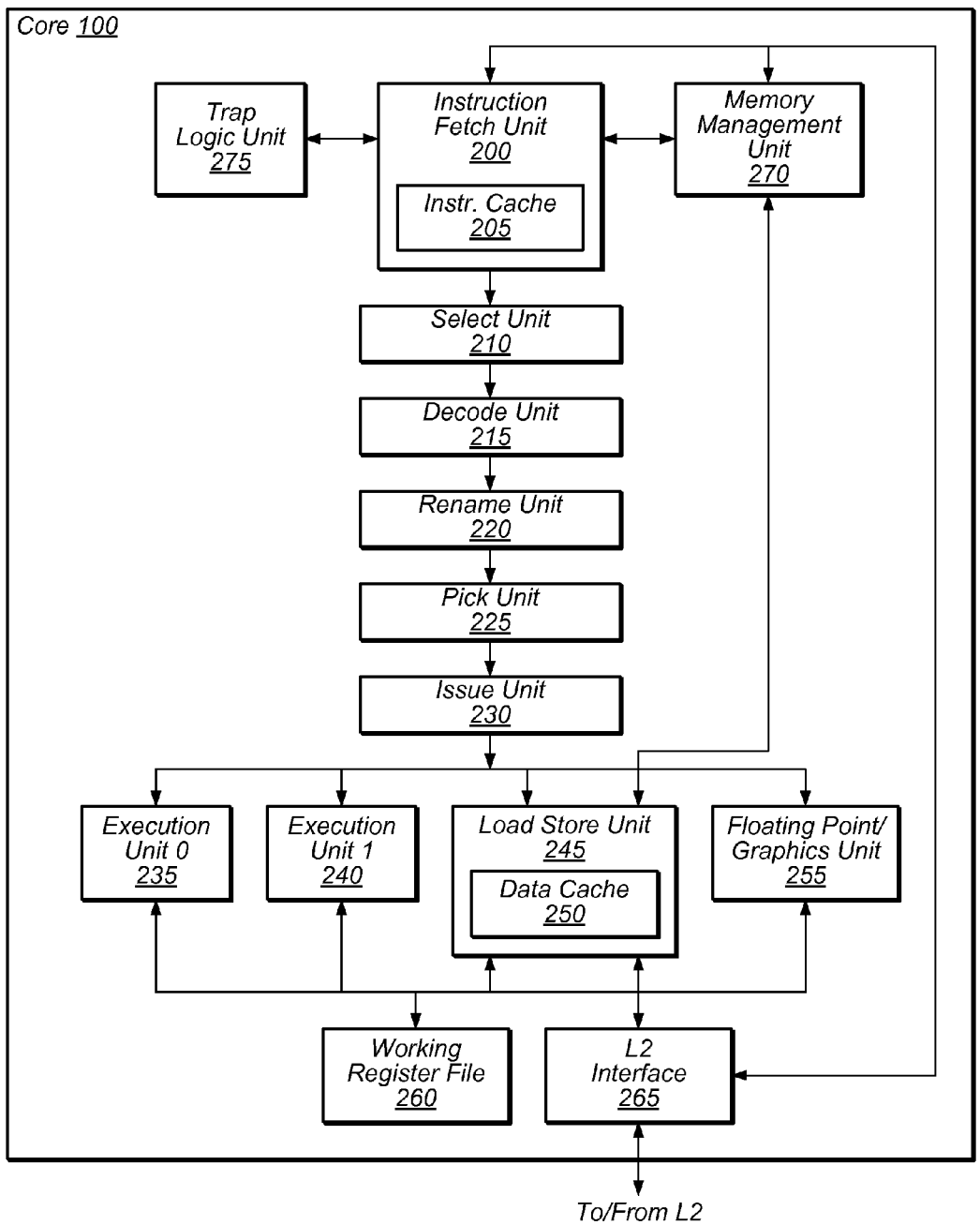
FIG. 2 is a block diagram of one embodiment of a processor core.
Figure 3:
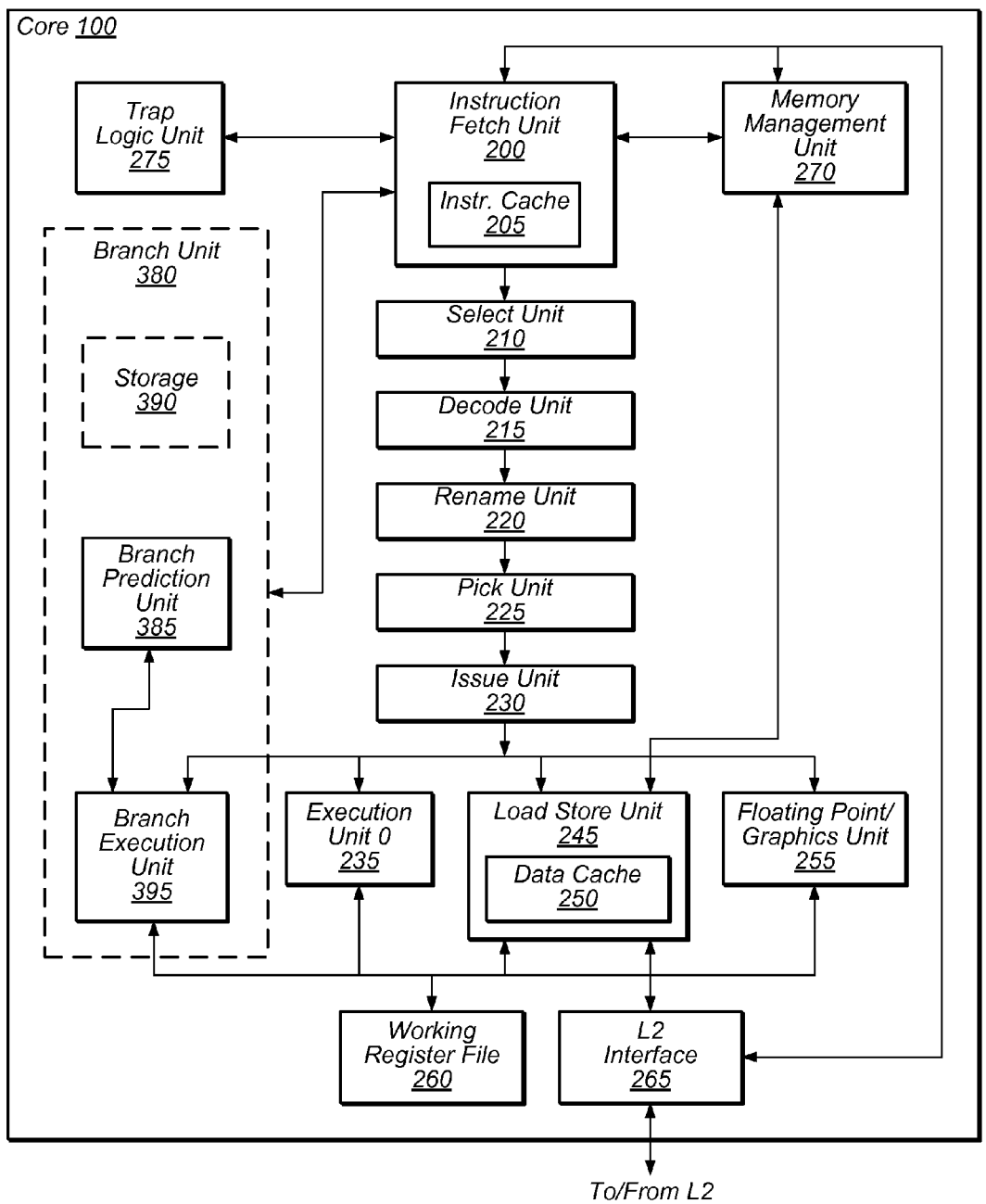
FIG. 3 is a block diagram of one embodiment of a processor core, including a branch unit.
Figure 4:
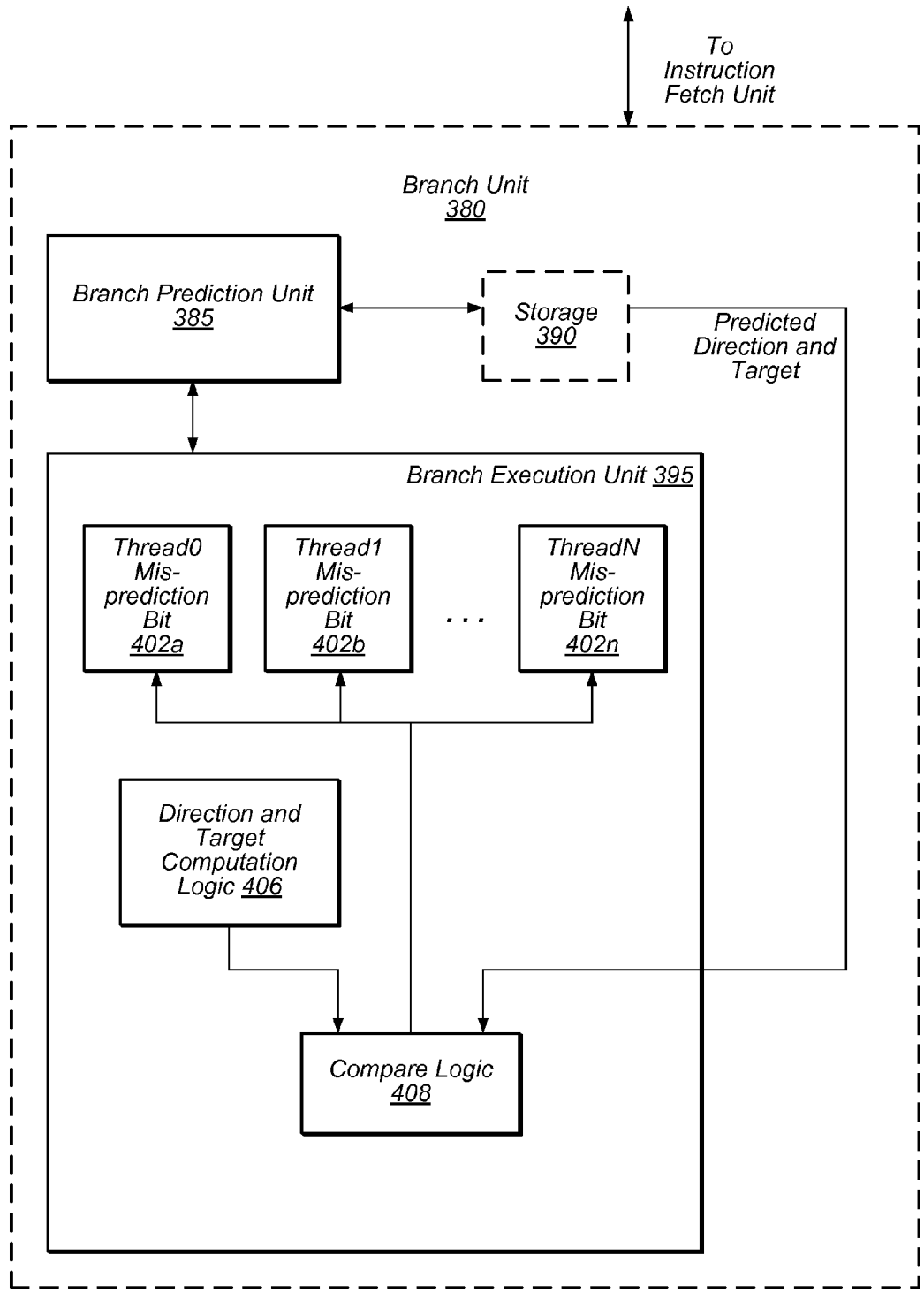
FIG. 4 is a block diagram of one embodiment of a branch unit.
Figure 5:
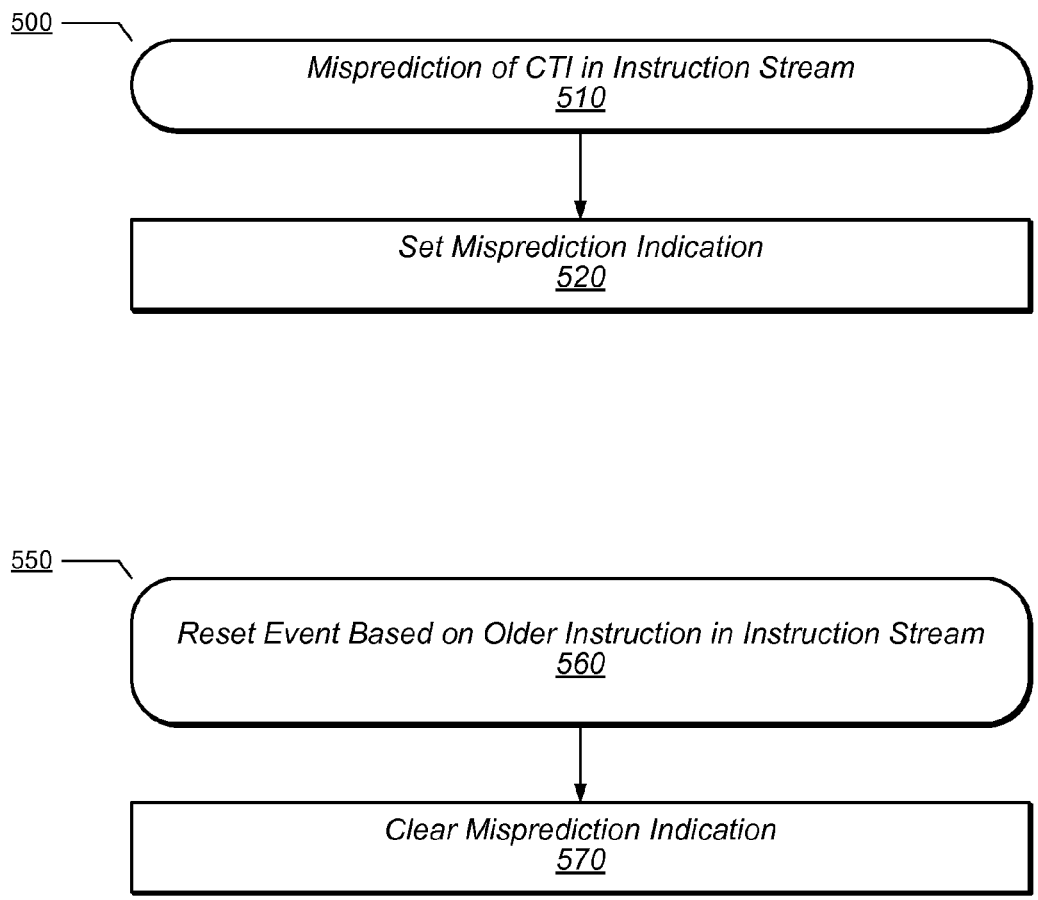
FIG. 5 is a flow diagram illustrating one embodiment of setting and clearing a misprediction indication.
Figure 6:
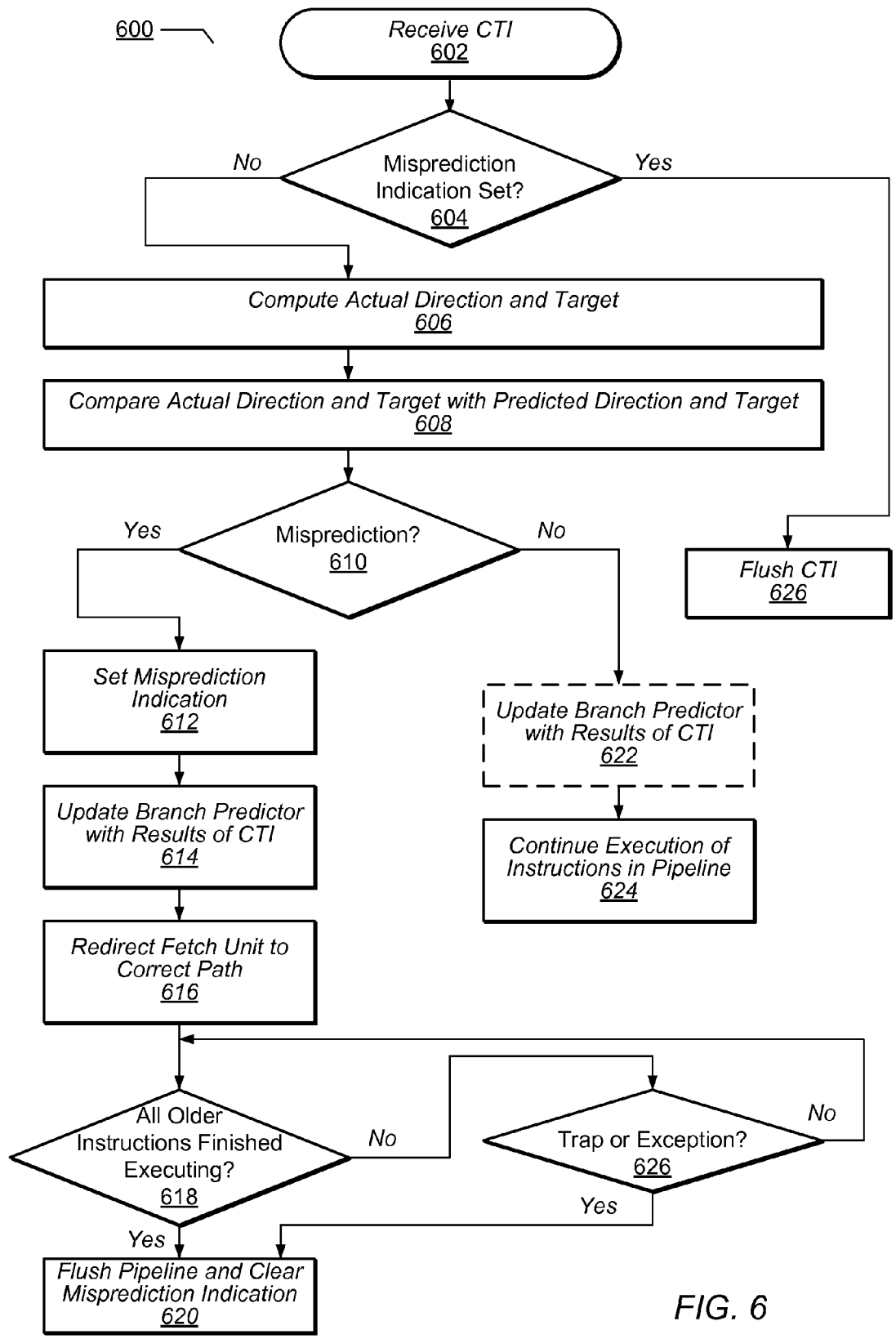
FIG. 6 is a flow diagram illustrating one embodiment of branch unit operation.
Figure 7:
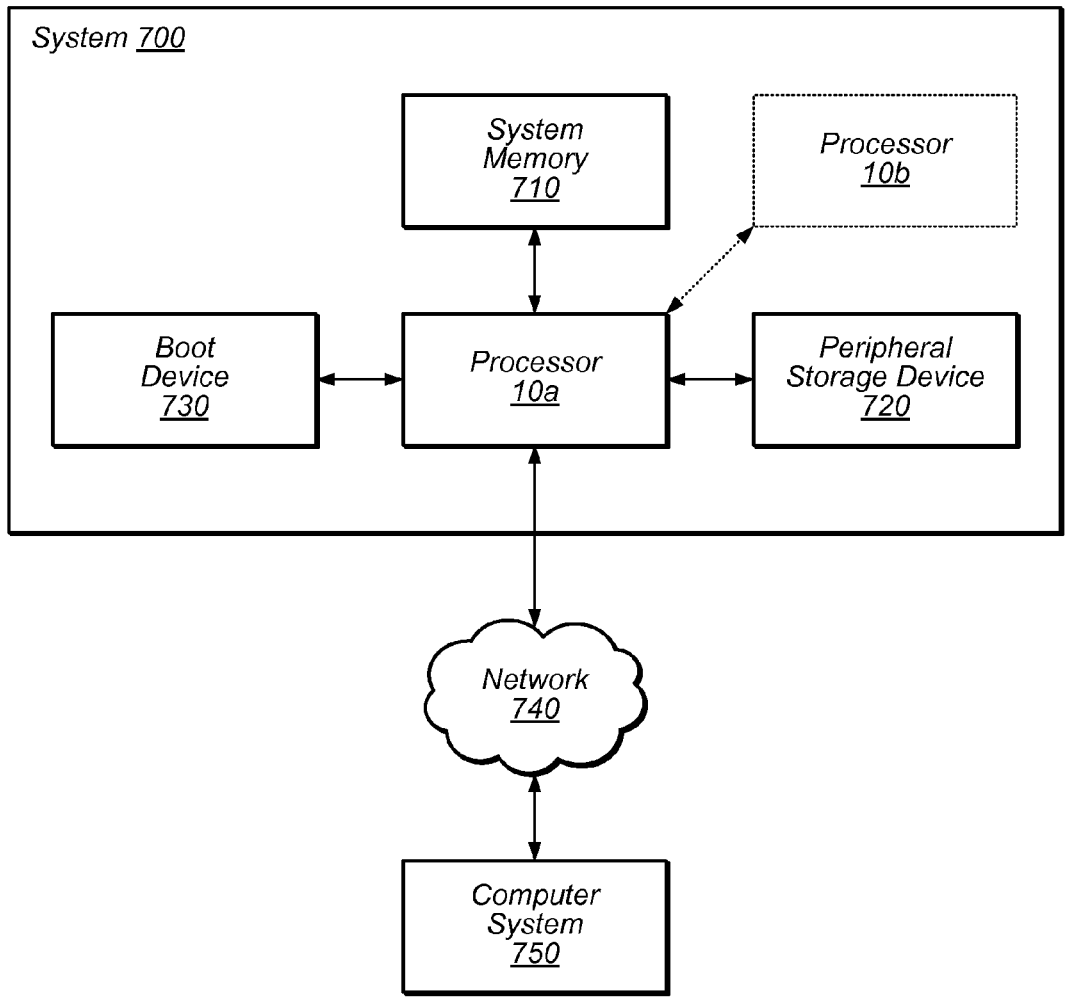
FIG. 7 is a block diagram illustrating an exemplary system embodiment.

The present disclosure describes various embodiments relating to an improved branch unit. FIGS. 1 and 2 present an overview of an exemplary multithreaded processor in which such a branch unit may be included. FIGS. 3 and 4 present exemplary embodiments of processor elements for suppression of CTIs on incorrect speculative execution paths. FIGS. 5 and 6 present exemplary methods for setting a misprediction indication and suppression of CTIs on incorrect speculative execution paths, respectively. FIG. 7 presents an overview of a computer system in which such a processor may be used.

General Overview of a Multithreaded Processor

Turning now to FIG. 1, a block diagram illustrating one embodiment of a processor 10 is shown. In certain embodiments, processor 10 may be multithreaded. In the illustrated embodiment, processor 10 includes a number of processor cores 100a-n, which are also designated "core 0" though "core n." As used herein, the term processor may refer to an apparatus having a single processor core or an apparatus that includes two or more processor cores. Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel (i.e., concurrently). Additionally, as described below in conjunction with the descriptions of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, write-back cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a write-back buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a write-back cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write through instead of write-back behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a write-back buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requestors.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating-point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating-point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating-point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requestors. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Branch Unit

In various embodiments, processor 10 or processor core 100 may include a branch unit, which may include one or more circuits relating to processing of control transfer instructions. For example, such a branch unit may include, in various embodiments, a branch prediction unit, a branch execution unit, storage elements relating to branch information, etc. In certain of these embodiments, a branch execution unit determines the actual direction and target of the oldest CTI in a given thread by executing the CTI, and then comparing the actual direction and target of the CTI with the predicted direction and predicted target to determine if the CTI was mispredicted. If a misprediction is detected, then all younger instructions on the incorrect speculative path behind the CTI are flushed, and the instruction fetch unit is redirected to fetch instructions from the corrected target address. The branch predictor is updated based on the actual direction and target of the oldest CTI.

Turning now to FIG. 3, one embodiment of a processor core 100 is shown. In this embodiment, processor core 100 includes a branch unit 380, which in turn includes storage 390, branch prediction unit 385, and branch execution unit 395. The branch unit 380 is coupled to the instruction fetch unit 200 in order to receive CTI instructions for branch prediction and to update the instruction fetch unit 200 (e.g., to fetch from a corrected execution path after a misprediction). The branch unit 380 is also coupled to issue unit 230 and the working register file 260 in this embodiment.

In certain embodiments of an out-of-order processor, it is possible that, when a CTI is executed by the execution unit, it is not the oldest instruction in the pipeline, as there may be older instructions that have not yet been executed. In a typical processor implementation, from a program-correctness standpoint, it is not desirable to flush the pipeline upon detection of the misprediction in these scenarios, as the older instructions still need to be executed prior to flushing. Therefore, all instructions older than the CTI that was mispredicted should be allowed to execute.

Furthermore, in an out-of-order machine, along with older instructions, there may be younger instructions on the incorrect speculative path that will be executed prior to flushing of the pipeline. The younger instructions on the speculative path might include CTIs, which could themselves result in mispredictions. Since the younger instructions are on a speculative path, their results are unreliable. Updating the branch predictor using results of instructions on a speculative path can result in reduced accuracy of the branch predictor. Also, updating the IFU and flushing the pipeline due to mispredicted CTIs on the speculative path is undesirable, as it will result in incorrect instructions being fetched and loss of performance. Embodiments are described below in which CTIs on mispredicted speculative paths are suppressed, and not permitted to affect branch prediction, pipeline flushes, or instruction fetching.

In one embodiment of a multithreaded processor that permits out-of-order execution, CTIs are executed in-order with respect to other CTIs from the same thread. However, CTIs are executed out-of-order with respect to other instructions from that thread. At execute time, a CTI misprediction is detected either because the predicted direction was wrong or because the predicted target was wrong. In either case, the instruction stream behind the CTI is then determined to be the "wrong" path. Upon such a misprediction, the following events should take place in some processor implementations:

1. The younger instructions behind the CTI misprediction are on an incorrect speculative path; they should be flushed and not allowed to update any architectural state of the machine.

2. The fetch unit should be redirected to fetch from the correct path after the CTI.

3. The branch predictor should be updated based on the results of the mispredicted CTI.

As previously indicated, the processor cannot be redirected and flushed until all the instructions older than the branch have executed. There are two reasons for this. First, until executed, the updates to the machine state (such as the integer register file and condition codes) caused by these instructions have not yet occurred. Second, it is possible one of those instructions may redirect the machine due to an exception, trap, etc.

Turning now to FIG. 4, one embodiment of a branch unit 380 is shown. In the embodiment of FIG. 4, branch execution unit 395 includes a misprediction bit for each thread (elements 402a-402n) to indicate a misprediction state for that thread. In other embodiments, other misprediction indicators may be used in place of, or in addition to a misprediction bit. In some embodiments, once a first CTI from a thread is detected to have been mispredicted, the misprediction bit is set for that thread (which may refer to either a logical 0 or 1, in various embodiments).

In one embodiment, once a CTI reaches branch execution unit 395, direction and target computation logic 406 computes the actual direction and target of the CTI instruction, and compare logic 408 compares those values to the direction and target predicted by branch prediction unit 385. The predicted direction and target may be stored in storage 390 which may be located in the branch unit or elsewhere, or may be otherwise passed down an execution pipeline to branch execution unit 395. If compare logic 408 finds that the actual and predicted directions or targets do not match, a misprediction has occurred for the CTI and the misprediction bit is set for corresponding to the CTI's thread. The instruction fetch unit (IFU) may be instructed to start fetching from a corrected path (based on the actual target of the CTI) as soon as the misprediction is detected. In one embodiment, branch prediction unit 385 is updated with the actual direction and/or target of the mispredicted CTI. Additionally, as previously described, younger instructions than the CTI need to be flushed from the execution pipeline, but instructions older than the CTI should be allowed to finish execution.

Since all CTIs are executed in-order for a given thread, there will not be any CTIs in the thread older than an executing CTI. But, while waiting for all instructions older than a mispredicted CTI to execute, there may be younger CTIs on the incorrect path that are executed. To handle these CTIs while preserving processor performance, in one embodiment, any given CTI that executes while the misprediction bit is set for the given CTI's thread will not affect flushing the pipeline, redirecting the processor to a new execution path, or updating the branch predictor. In certain embodiments, any CTI that is executed while the misprediction bit is set may be simply flushed or ignored.

Once all instructions older than the mispredicted CTI (that caused the misprediction bit to be set) have finished executing, the execution pipeline may be flushed, and the mispredict bit may be cleared or reset. In one embodiment, the misprediction bit is also reset if any instruction older than the mispredicted CTI results in an exception, trap, or some other similar control flow change.

In the embodiments described above, younger CTI instructions on mispredicted execution paths will not degrade the accuracy of branch prediction unit 385, or result in incorrect flushing or updating of the IFU. The embodiment of FIG. 4 is intended to exemplify one possible implementation of a branch unit, particularly the use of a misprediction indication (e.g., the misprediction bits 402a-402n) to prevent branch predictor contamination. However, the particular elements and connectivity of FIG. 4 are used to better explain one embodiment, but are not meant to limit other embodiments in any way.

Turning now to FIG. 5, flow diagrams illustrating methods 500 and 550 for setting and clearing a misprediction indication are shown. In response to misprediction of a CTI in an instruction stream (event 510), a misprediction indication is set for the instruction stream (block 520). In response to a reset event based on at least one older instruction (relative to the mispredicted CTI) in the instruction stream (event 560), the misprediction indication is cleared (block 570). The event of block 560 may be a trap or exception caused by an older instruction in the instruction stream, or completion of all older instructions in the instruction stream. Completion of instructions may refer to the results of instructions being committed to the architectural state of the processor, or to completion of execution of instructions. The misprediction bits 402a-402n of FIG. 4 are examples of misprediction indications. Because CTIs occur in program order with respect to other CTIs in an instruction stream, if a CTI occurs when the misprediction indication is set in a given instruction stream, it is known to be on an incorrect execution path, and its results will be suppressed as previously described.

Turning now to FIG. 6, a flow diagram 600 illustrating one embodiment of operation of a branch unit is shown. A CTI is received at the execution stage of a pipeline, e.g., at a branch execution unit (event 602). A misprediction indication is checked (decision block 604). If the misprediction indication is set, the CTI is known to be a younger CTI than a mispredicted CTI, and therefore is on an incorrect speculative execution path and is flushed (block 626). In other embodiments, such a CTI may be ignored or blocked rather than flushed.

If the misprediction indication is not set, the actual direction and target of the branch are computed (block 606). The actual direction and target are compared to a predicted direction and target of the CTI (block 608), e.g., as predicted by a branch prediction unit. If the CTI was not mispredicted (as determined in decision block 610), a branch predictor may be updated with the results of the CTI (block 622), and instructions will continue to execution in the pipeline (624). In some embodiments, block 622 is not implemented because the branch predictor is only updated on a mispredict and otherwise assumed to be correct.

If a misprediction occurred (as determined in decision block 610), a misprediction indication is set (block 612). The branch predictor is updated with the results of the CTI (block 614). An IFU is updated to fetch from a corrected execution path (block 616). Note that, in the illustrated embodiment, the updating of the branch predictor and the updating of the IFU occur before commitment of the mispredicted CTI. In some embodiments, this permits the IFU to begin fetching instructions along the correct execution path and the branch predictor to use the updated CTI results prior to commitment of the mispredicted CTI. At this point, CTI execution is stalled until either all instructions older than the CTI have finished executing, or a trap or exception occurs (as indicated by the loop around decision blocks 618 and 626). Once all instructions older than the mispredicted CTI have finished executing or a trap or exception occurs, the pipeline is flushed (flushing all instructions younger than the CTI), and the misprediction indication is cleared (block 620). In certain embodiments, the pipeline may be flushed as soon as the mispredicted CTI commits its results.

FIG. 6 illustrates a specific embodiment of branch unit operation, and is not meant to limit other embodiments, but to explain a specific example of branch unit operation that suppress results of CTIs on incorrect speculative execution paths.

Note that the flow diagram of FIG. 6 shows operation of only a single processor thread and instruction stream, but could be applied to several threads as well, as previously described. In multi-threaded embodiments, a misprediction indication for a given thread may not affect threads other than the given thread. In the embodiment of FIG. 6, the branch predictor is updated with results of a mispredicted CTI (block 614) as soon as the misprediction is determined (rather than waiting for a CTI to finish execution or commit results). The branch predictor update can be performed at this point because CTIs are executed in program order with respect to other CTIs in a given thread. Therefore, CTIs that occur when the misprediction indication is not set are known to be relevant to the branch predictor without waiting for information from any other instructions.

Exemplary System Embodiment

As described above, in some embodiments, processor 10 of FIG. 1 may be configured to interface with a number of external devices. One embodiment of a system 700 including processor 10 is illustrated in FIG. 7. In the illustrated embodiment, system 700 includes an instance of processor 10, shown as processor 10a, that is coupled to a system memory 710, a peripheral storage device 720 and a boot device 730. System 700 is coupled to a network 740, which is in turn coupled to another computer system 750. In some embodiments, system 700 may include more than one instance of the devices shown. In various embodiments, system 700 may be configured as a rack-mountable server system, a standalone system, or in any other suitable form factor. In some embodiments, system 700 may be configured as a client system rather than a server system.

In some embodiments, system 700 may be configured as a multiprocessor system, in which processor 10a may optionally be coupled to one or more other instances of processor 10, shown in FIG. 10 as processor 10b. For example, processors 10a-b may be coupled to communicate via their respective coherent processor interfaces 160.

In various embodiments, system memory 710 may comprise any suitable type of system memory as described above, such as FB-DIMM, DDR/DDR2/DDR3/DDR4SDRAM, RDRAM®, flash memory, and of various types of ROM, etc. System memory 710 may include multiple discrete banks of memory controlled by discrete memory interfaces in embodiments of processor 10 that provide multiple memory interfaces 130. Also, in some embodiments, system memory 710 may include multiple different types of memory.

Peripheral storage device 720, in various embodiments, may include support for magnetic, optical, or solid-state storage media such as hard drives, optical disks, nonvolatile RAM devices, etc. In some embodiments, peripheral storage device 720 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 720 may be coupled to processor 10 via peripheral interface(s) 150 of FIG. 1.

As described previously, in one embodiment boot device 730 may include a device such as an FPGA or ASIC configured to coordinate initialization and boot of processor 10, such as from a power-on reset state. Additionally, in some embodiments boot device 730 may include a secondary computer system configured to allow access to administrative functions such as debug or test modes of processor 10.

Network 740 may include any suitable devices, media and/or protocol for interconnecting computer systems, such as wired or wireless Ethernet, for example. In various embodiments, network 740 may include local area networks (LANs), wide area networks (WANs), telecommunication networks, or other suitable types of networks. In some embodiments, computer system 750 may be similar to or identical in configuration to illustrated system 700, whereas in other embodiments, computer system 750 may be substantially differently configured. For example, computer system 750 may be a server system, a processor-based client system, a stateless "thin" client system, a mobile device, etc. In some embodiments, processor 10 may be configured to communicate with network 740 via network interface(s) 160 of FIG. 1.

* * *

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a processing element configured to execute all control transfer instructions (CTIs) within an instruction stream in program order and further configured to execute other instructions in the instruction stream out of program order, wherein the processing element includes:
    a branch unit configured, in response to a mispredicted CTI in the instruction stream, to discontinue updating branch prediction information for subsequent CTIs in the instruction stream, wherein the branch unit is configured to resume updating branch prediction information for subsequent CTIs in the instruction stream in response to completion of all instructions in the instruction stream that are older than the mispredicted CTI.

2. The apparatus of claim 1, wherein the branch unit is further configured to resume updating branch prediction information for subsequent CTIs in the instruction stream in response to an exception or a trap caused by an instruction in the instruction stream that is older than the mispredicted CTI.

3. The apparatus of claim 1, wherein the processing element includes an execution pipeline, wherein the apparatus is configured, in response to the mispredicted CTI, to discontinue flushing of instructions in the execution pipeline in response to subsequent CTI mispredictions, and wherein the apparatus is configured to resume flushing of instructions in the execution pipeline in response to subsequent CTI mispredictions in response to a reset event.

4. The apparatus of claim 1, wherein the processing element is configured, in response to the mispredicted CTI, to discontinue fetching of instructions from updated execution paths in response to subsequent CTI mispredictions, and wherein the apparatus is configured to resume fetching of instructions from updated execution paths in response to subsequent CTI mispredictions in response to a reset event.

5. The apparatus of claim 1, wherein the processing element is configured such that CTI mispredictions that occur between the discontinuing and the resuming do not cause pipeline flushes, instruction fetches from an updated execution path, or updates to a branch predictor.

6. The apparatus of claim 1, wherein the processing element is configured to execute instruction streams from multiple threads and separately discontinue and resume updating of branch prediction information for threads of the multiple threads.

7. A processor, comprising:
 a branch unit configured to set a misprediction indication in response to misprediction of a control transfer instruction (CTI) in an instruction stream, wherein the branch unit is configured to store branch prediction information usable to make predictions of CTIs fetched by the processor;
 wherein the branch unit is further configured to reset the misprediction indication based on completion of all instructions in the instruction stream that are older than the mispredicted CTI;
 wherein the branch unit is further configured to update the branch prediction information for CTIs that reach an execution stage of the processor when the misprediction indication is not set, but not for CTIs that reach the execution stage when the misprediction indication is set; and
 wherein the processor is configured to execute all CTIs in the instruction stream in program order with respect to each other.

8. The processor of claim 7, wherein the processor is configured to update the branch prediction information after determining if a given CTI was mispredicted, but before committing results of the CTI.

9. The processor of claim 7, wherein the processor is configured such that CTI mispredictions that occur in the instruction stream when the misprediction indication is set do not cause pipeline flushes or instruction fetches from an updated execution path.

10. The processor of claim 7, wherein the processor is configured to postpone flushing a pipeline of the processor in response to the mispredicted CTI until after at least one of: completion of all instructions in the instruction stream that are older than the mispredicted CTI and an exception or trap.

11. The processor of claim 7, wherein the processor is configured to execute instruction streams from multiple threads, wherein the processor is configured to concurrently store multiple misprediction indications, each corresponding to one of the multiple threads.

12. The processor of claim 11, wherein each misprediction indication of the multiple misprediction indications does not affect execution of threads other than a thread to which it corresponds.

13. A method, comprising:
 a processor executing all control transfer instructions (CTIs) in an instruction stream in program order and executing other instructions in the instruction stream out of program order;
 the processor, in response to a mispredicted CTI in the instruction stream, discontinuing updating branch prediction information for subsequent CTIs in the instruction stream;
 the processor resuming updating branch prediction information for subsequent CTIs in the instruction stream in response to detecting at least one of: completion of all instructions in the instruction stream that are older than the mispredicted CTI and an exception or a trap caused by an instruction in the instruction stream that is older than the mispredicted CTI.

14. The method of claim 13, further comprising, in response to the mispredicted CTI, discontinuing fetching of instruction from updated execution paths based on subsequent CTI mispredictions and resuming fetching of instructions from updated execution paths in response to subsequent CTI mispredictions in response to a reset event.

15. The method of claim 13, further comprising fetching from a corrected execution path, updating the branch prediction information, and flushing one or more instructions of the instruction stream in response to the mispredicted CTI.

16. The method of claim 13, further comprising executing instruction streams from multiple threads, including executing CTIs of each particular thread of the multiple threads in program order with respect to other CTIs in the particular thread.

* * * * *

UNITED STATES PATENT AND TRADEMARK OFFICE
CERTIFICATE OF CORRECTION

| | | |
|---|---|---|
| PATENT NO. | : 8,862,861 B2 | Page 1 of 1 |
| APPLICATION NO. | : 13/228329 | |
| DATED | : October 14, 2014 | |
| INVENTOR(S) | : Olson et al. | |

It is certified that error appears in the above-identified patent and that said Letters Patent is hereby corrected as shown below:

In the Specification

In column 1, line 11, delete "entirety" and insert -- entirety. --, therefor.

In column 5, line 46, delete "L3cache" and insert -- L3 cache --, therefor.

In column 12, line 5, delete "EXU1240" and insert -- EXU1 240 --, therefor.

In column 12, line 12, delete "EXU1240" and insert -- EXU1 240 --, therefor.

Signed and Sealed this
Sixteenth Day of June, 2015

Michelle K. Lee
*Director of the United States Patent and Trademark Office*